UNITED STATES PATENT OFFICE.

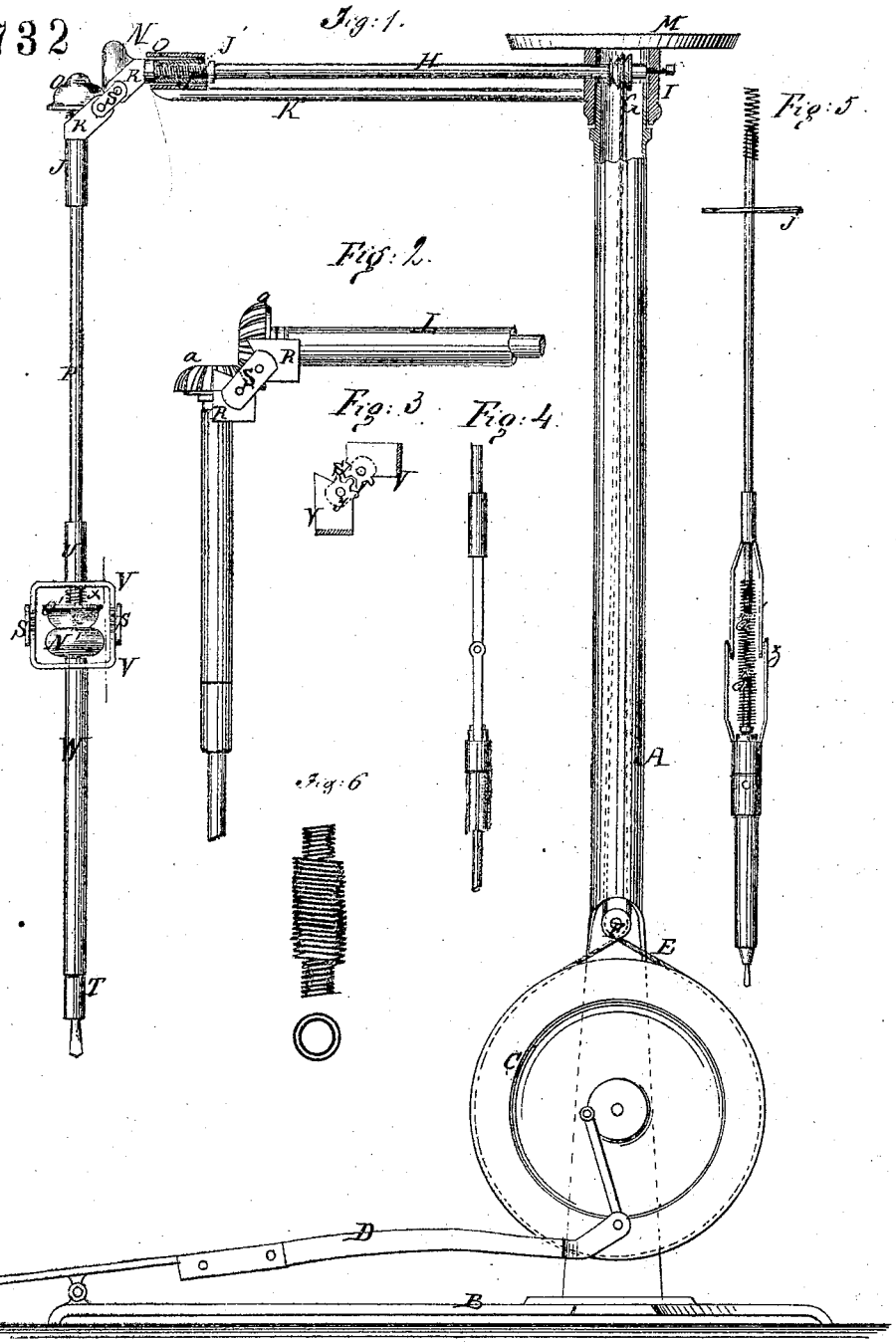

GREENE V. BLACK, OF JACKSONVILLE, ILLINOIS.

IMPROVEMENT IN DENTAL DRILLS.

Specification forming part of Letters Patent No. 117,732, dated August 8, 1871.

*To all whom it may concern:*

Be it known that I, GREENE V. BLACK, of Jacksonville, in the county of Morgan and State of Illinois, have invented a new and useful Improvement in Dentists' Tooth-Dressing Machine; and I do hereby declare that the following is a full, clear, and exact description thereof, which will enable others skilled in the art to make and use the same, reference being had to the accompanying drawing forming part of this specification.

My invention consists in improving dentists' teeth-dressing machines, as hereinafter fully described and subsequently pointed out in the claim.

Figure 1 is a side elevation (partly sectioned) of a machine such as I propose to employ for this purpose. Fig. 2 is a view of two shafts connected together by a modified arrangement of gearing and connecting devices. Figs. 3 to 6, inclusive, show other modifications of connecting and driving apparatus.

Similar letters of reference indicate corresponding parts.

A is a hollow post rising up from any suitable stand or base, B. C is a driving-wheel, mounted on A near the base and worked by a treadle, D. This wheel works a belt, E, passing over the guide-pulley F, as shown, and up through the hollow post to the pulley G of a line-shaft, H, borne at one end in the revolving cap I on the top of the post A, and at the other end in the outer end of a long arm, K; or it may be a tube, as L, Fig. 2, projecting from the revolving cup. M is a table mounted on the top of cap I for holding the tools to be used in connection with the apparatus. The outer end of shaft H has an India-rubber friction-wheel, N, having a concave side and convex face or periphery which acts upon a convex wheel, O, upon the end of shaft P, connected to a short tube, J', placed in the bearing Q, by the tube J, oblique-toothed yokes or projections R, and the pivoted link S. This shaft P is connected to another, T, by the short tube U, jointed and toothed yokes V, links S, and the tube W, and the said shafts are geared together by wheels N' and O'. In this case a coiled spring, X, is arranged between one of the yokes V and the wheel O'; also, between stem J and wheel O, to press the wheels against each other to cause sufficient friction to impart rotation to shaft T. This shaft T carries the drills, burs, or other revolving tools used upon the teeth. The tube W affords a handle by which to hold it for guiding and directing the tool to the work while it is revolved by the treadle-motion and connecting-shafts.

Instead of using the pivoted link S to connect the two tubes or bearings, I may employ the toothed plates or ears, y, Fig. 3; or the shafts may be jointed, as in Fig. 4; or, again, the tubes may be jointed by the yokes Z, Figs. 5 and 6, and the shafts connected by coiled wires Z', which will allow them to be turned out of the right line. In this latter case the shafts may have disks j or balance-wheels, which are to be used to steady them in case the coil becomes bent; but, to prevent this, I propose to make the said coils double, one within the other, the outer one being coiled in one direction and the other in the opposite direction, so that the resistance operating to coil up the outer one and make it smaller will uncoil the inner one and make it larger; thus the two will brace each other and prevent the coil twisting upon itself when the resistance is unequal, thereby causing the bit to run steady, which could not be the case if only a single coil be used. This arrangement of the coiled wires is clearly shown in the said Fig. 6.

In some cases I may employ toothed wheels a, Fig. 2, instead of the friction-wheels, the teeth being curved across the faces of the wheels to gear properly, no matter what angle the shafts may represent, between the angle of ninety degrees.

It will be seen that the shafts P and T may, besides being pointed in any direction, be swung around the axis of shaft H by the turning of the tube in bearings Q, to which tube the joint is connected. The coiled-wire connection also admits of pointing the tools in any direction.

Having thus described my invention, I claim as new and desire to secure by Letters Patent—

1. The arrangement of the horizontal shaft H upon a rigid arm, K, thereunder, and both in the same swivel-sleeve I, resting upon standard A, to sustain the shaft-and-gear mechanism firmly at the altitude required.

2. The double and reversed coil spring described and shown in Fig. 6 of drawing, when constructed and applied as and for the purpose specified.

GREENE V. BLACK.

Witnesses:
A. C. WADSWORTH,
J. MARCH PATTERSON.